United States Patent [19]
Biber et al.

[11] 3,791,278
[45] Feb. 12, 1974

[54] PHOTOGRAPHIC APPARATUS WITH SOLENOID POWERED INSTRUMENTALITIES

[75] Inventors: Conrad H. Biber, Needham; Edwin K. Shenk, Littleton, both of Mass.

[73] Assignee: Polaroid Corporation, Cambridge, Mass.

[22] Filed: July 19, 1971

[21] Appl. No.: 163,948

[52] U.S. Cl. ............................................. 95/53 EA
[51] Int. Cl. .............................................. G03b 9/62
[58] Field of Search.. 95/53 EA, 53 EB; 317/DIG. 6

[56] References Cited
UNITED STATES PATENTS

| | | | |
|---|---|---|---|
| 3,396,314 | 8/1968 | Corson et al. ................. | 317/DIG. 6 |
| 3,605,588 | 9/1971 | Ort et al. ................................. | 95/10 |
| 3,466,993 | 9/1969 | Fahlenberg et al. ................. | 95/53 X |
| 3,511,157 | 5/1970 | Eloranta ................................. | 95/53 |
| 3,411,045 | 11/1968 | Reyner ........................... | 317/DIG. 6 |
| 3,205,412 | 9/1965 | Winston ........................ | 317/DIG. 6 |

*Primary Examiner*—Samuel S. Matthews
*Assistant Examiner*—Michael L. Gellner
*Attorney, Agent, or Firm*—Gerald L. Smith

[57] ABSTRACT

Photographic apparatus incorporating a solenoid driven shutter and self-contained battery power supply. To conserve energy available from the battery, a power-down feature is selectively activated during those portions of an automatic photographic cycle requiring a closed shutter condition. The power-down feature particularly incorporates a dual circuit path configuration leading directly from the battery power supply to the excitation winding of the solenoid. At the commencement of energization of the solenoid, full available current is imposed through both circuit paths until such time as the plunger of the solenoid reaches a high flux linkage condition. As this condition is reached, one circuit path is rapidly switched off to permit energization of the solenoid winding to continue through the opposite circuit path at a selectively lower current level. A signaling arrangement is utilized to initiate the noted switching.

18 Claims, 8 Drawing Figures

PHOTOGRAPHIC APPARATUS WITH SOLENOID POWERED INSTRUMENTALITIES

BACKGROUND

Fully automated, but thin and compact photographic cameras have been proposed wherein the exposure of a film unit is controlled electronically, immediately following which the exposed film unit is rapidly processed at a self-contained processing station. A version of such a camera, having a compactness and thinness suited to permit convenient carrying in the pocket of a garment is described in a U.S. Pat. entitled, "Reflex Camera," by E. H. Land, No. 3,672,281. The design of this camera represents a unique union of several distinct mechanisms and related control functions which are harmoniously interrelated to achieve the noted requisites of full automation as well as compactness. For instance, one sub-system of the camera contributing to its thinness is present as a viewing and focusing function including a reflexing arrangement operated from a combination of springs and a miniature electric motor. The output from this motor is utilized for initially releasing a reflexing member for movement from a position securing the exposure plane of the camera and for subsequently cocking it to resecure that exposure plane. Processing of an exposed film unit is carried out during the noted cocking procedure, the electric motor being called upon to simultaneously provide drive both for the processing station and the noted cocking activity.

The shutter or exposure mechanism of the camera is configured to normally assume a non-energized, fully opened condition for purposes of facilitating reflex viewing and focusing. In the course of a photographic cycle, this shutter is energized to assume a closed orientation during the above-noted manipulation of the reflex member converting the camera between viewing and exposure mode configurations. When retained in this closed, energized state, the shutter serves to secure the exposure chamber of the camera, thereby protecting the uncovered exposure plane.

An important design aspect contributing significantly to the compact camera design resides in the configuration of a self-contained battery for reliably powering the exposure control system as well as the electric motor drive. Because of extreme limitations in available space for mounting such a power supply within the compact camera and in view of the critical importance of the reliability of that power supply, the shape and size of any battery utilized represents a limiting design parameter. To optimize power supply density with respect to overall camera size, not only is significant consideration given to the design of the battery package, but also the power supply represented thereby must be utilized practically and efficiently.

SUMMARY

The present invention is addressed to photographic apparatus operative to optimize the utilization of available energy from an associated self-contained power supply. As a consequence, the inventive system is particularly useful to the development of a reliable, fully automatic camera of highly compact design.

One embodiment of the invention is contemplated for use in conjunction with photographic apparatus having a shutter driveable into a closed orientation by a tractive electromagnetic actuator, such as a solenoid. This solenoid is structured to establish a condition evidencing high flux linkage with an associated armature or plunger at such time as the shutter is driven into a fully closed position. The control circuit of the photographic system functions to selectively reduce this high flux linkage at a predetermined point in time following movement of the shutter to its closed position. Flux linkage reduction is carried out by reducing current input to the excitation coil of the electromagnetic actuator when the drive plunger thereof is at a terminal position evidencing a most efficient flux linkage. The lower current demands made upon a self-contained battery power source are significantly lowered as a consequence of this regulation.

Another feature and object of the invention is to provide a control system for a very compact automatic camera of a variety incorporating a shutter system which is driven to a closed orientation by an actuator powered from a self-contained battery within the camera. The automatic camera additionally includes motor driven instrumentalities including a self-processing station. Th control system is characterized in providing for the selective reduction of current input to the shutter actuator drive at a select point in time following its actuation to a fully closed position.

Another aspect of the invention provides a control system for a fully automatic reflex type camera which utilizes a solenoid driven shutter which is energized from a self-contained battery power source to achieve a fully closed status. This shutter is retained in a fully closed status during the operation of other electrically driven instrumentalities within the camera. To minimize current drains from the self-contained battery during periods of full closure, current input to the noted shutter solenoid is selectively reduced when it is fully closed and the plunger element thereof is in a position evidencing an available high flux linkage. The amount of current reduction provided is predetermined in accordance with the holding force required to retain the shutter in its fully closed position.

One embodiment of the invention features a control system which provides for simultaneous current insertion to a solenoid from a full power input circuit path as well as a power-down circuit path providing for selectively reduced current input. At a point in time following the full closure of the noted solenoid driven shutter, the full power input circuit path is deactivated to permit the power-down path to retain the shutter in its fully closed position. The noted shutter may be actuated to open under a selective spring bias upon the deactivation of the power-down path. With the noted arrangement, no possibility exists for current interruption during a transition from a fully powered status to a power-down status of the shutter driving solenoid.

Other objects of the invention will in part be obvious and will in part appear hereinafter. The invention accordingly comprises the apparatus possessing the construction, combination of elements and arrangement of parts which are exemplified in the following detailed disclosure. For a fuller understanding of the nature and objects of the invention, reference should be had to the following detailed description taken in connection with the accompanying drawings.

DETAILED DESCRIPTION

Figures 1, 2, 3:
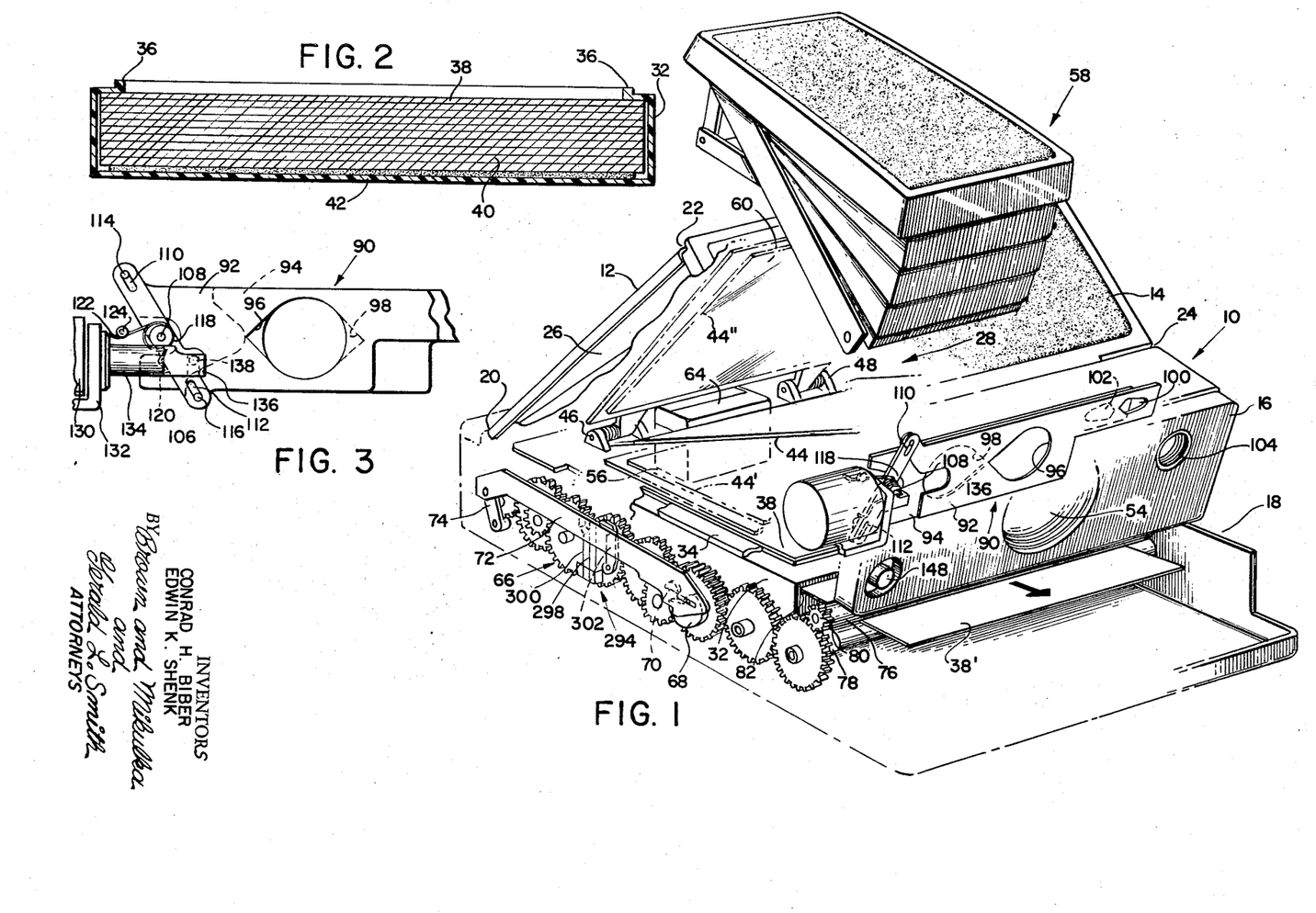
FIG. 1 is a pictorial view of a fully automatic camera incorporating the unique control features of the invention with portions shown in phantom and broken away to reveal internal structure.
FIG. 2 is a cross-sectional view of a film cassette insertable within the camera of FIG. 1.
FIG. 3 is a fragmentary plan view of a shutter assembly incorporated in the camera of FIG. 1.

Referring to FIG. 1, a fully automatic camera incorporating the features of the instant invention is portrayed generally at 10. The several articulated housing components of camera 10, including rear wall 12, forward wall 14 and exposure control housing 16 are pivotally associated with a base member 18 so as to be foldable thereinto in nesting fashion. When so folded from the erected configuration shown, the camera assumes a thin and compact shape suiting it to be conveniently carried in the pocket of a garment. The specific hinge connections providing for the articulated structure, while not being visible in the figure, are positioned at axes 20, 22, 24 and at the lower rear portion of exposure control housing 16. When erected for making an exposure, rear wall 12, forward wall 14 and exposure control housing 16 combine in conjunction with an opaque flexible bellows, a portion or fragment of which is illustrated at 26, to define an exposure chamber generally depicted at 28.

A major or significant portion of available volume within the rectangular base 18 is assumed by a disposable, film retaining cassette 32. Cassette 32 is removably positioned against an inner frame, a portion of which is shown at 34, located at and defining the lower surface of exposure chamber 28. Cassette 32 is formed having a ridge 36 defining a rectangular film frame opening and beneath which an uppermost film unit 38 is located. More clearly revealed in a cross-sectional view of cassette 38 in FIG. 2, the uppermost film unit 38 of an assemblage of stacked film units 40 is positioned at the exposure plane of the camera 10.

While remaining compact and foldable into a thin configuration, camera 10 incorporates a significant number of powered control features which harmoniously interrelate to provide fully automated operation. To provide a high quality viewing and focusing system, the camera 10 operates in a modified reflex fashion, being convertible between viewing and exposure operational modes by a reflex assembly including a somewhat planar reflex reflecting component 44. Shown in solid line fashion at an intermediate position during a transition between exposure and viewing modes of operation, the component 44 is movable during a photographic cycle from a position shown in phantom at 44' where it serves to secure the exposure plane to a position shown at 44'' against the internal side of rear wall 12. In the orientation shown in phantom at 44'', reflex component 44 introduces a mirror 60 mounted upon its underside into the optical path of the camera. Movement between the viewing mode and exposure mode positions illustrated in phantom is pivotal, the component 44 being coupled to inner frame 34 and driven from hinges 46 and 48.

When in the viewing mode position at 44', reflex component 44 is latched against the bias of a drive spring operating in conjunction with a drive linkage coupled with hinge 46. The optical path of the camera for this viewing orientation extends from a taking or objective lens mounted at 54, thence to a mirror positioned at the inner side of rear wall 12 and thence to a viewing surface 56 positioned on the upward surface of reflex component 44. Viewing surface 56 is configured having a texture and optical design facilitating the focusing of the image of the scene to be photographed. This image may be viewed by the camera operator through a collapsible optical entrance assembly depicted generally at 58. A configuration suited for viewing surface 56 is described and claimed in a for U.S. Pat. No. 3,690,240, by Nathan Gold, entitled, "Reflective Imaging Apparatus," while the assembly 58 and its related internal components are described in detail in a copending application for U.S. Pat. by James G. Baker, filed Dec. 15, 1970, entitled, "Reflex Camera and Viewing Device," Ser. No. 98,356, and assigned in common herewith.

When the above-described viewing mode optical path is altered by virtue of the positioning of reflex component 44 against rear wall 12 as shown at 44'', the optical path extends from the taking lens at 54 to mirror surface 60, thence to the exposure plane at which is positioned uppermost film unit 38.

To manipulate reflex component 44 between its viewing position at 44' and its exposure position at 44'', the camera 10 incorporates a control system which operates through the interaction of the noted drive springs and an electric motor 64 positioned within base 18 rearwardly of cassette 32. Described in detail and claimed in U.S. Pat. No. 3,714,879 by E. H. Land, I. Blinow, and V. K. Eloranta, entitled, "Reflex Camera," the control system utilizes the output of motor 64 to drive an elongate, thin gear train, certain components of which are shown generally at 66 extending along one side of camera 10. Gear train 66 includes one reduction ratio circuit terminating in a phase control cam 68 which is rotatably driven through one revolution during the course of a single photographic cycle. Cam 68 operates in conjunction with a cam follower 70 mounted upon the inwardly facing side of an elongate ram 72 slideably positioned along gear train 66. Ram 72 is driveably connected to an input bell crank 74, in turn, coupled to hinge assembly 46 through the noted drive spring and other associated linkages as described in the noted application for patent, Ser. No. 134,733. Through controlled, selective energization of motor 64, the cooperating cam 68 and cam follower 70 serve initially to retain reflex component 44 in its viewing mode position at 44', then to release component 44 for movement under drive spring bias into its exposure position at 44'' following a brief energization of motor 64, and to cock the noted drive spring as well as drive component 44 into its viewing position following an exposure interval by again energizing motor 64 for a more lengthened period of time.

During the latter, more lengthy interval of energization of motor 64, a second reduction circuit within gear train 66 functions to drive the uppermost one of a pair of processing rolls 76 and 78. Connection between the upper processing roll 76 and gear train 66 is made at a drive pinion 80. During a cocking procedure, a pick mechanism (not shown) urges uppermost film unit 38 from its position within cassette 32 through an egress slot 82 and into the bite or point of contact between rolls 76 and 78. Described in detail in a U.S. Pat. by E. H. Land, No. 3,415,644, entitled, "Novel Photographic Products and Processes," film units as at 38 and 40 include all the materials necessary to produce positive photographic prints. In this regard, one feature of the units 38 and 40 resides in the provision of a rupturable container of processing fluid secured to the edge of the photosensitive composite in a position such that it is initially introduced into rolls 76 and 78. When the unit as at 38 is drawn through slide 82 and between rolls 76 and 78, the container selectively ruptures and uniformly dispenses a processing fluid therewithin. Image-forming results from this processing procedure. The developing process is now well known in the art and it involves the formation of transverse image-forming substances in an exposed photosensitive element of the unit accompanied by their diffusion in a manner forming a visible positive image. The processing fluid within each unit 38 or 40 includes an opacifying agent which is spread as a layer to provide a background for the photosensitive transfer image evolving during development. In FIG. 1, uppermost film unit 38 is illustrated as at 38' in a position assumed during the course of a processing procedure. Note additionally, that when film unit 38 is at position 38', reflex component 44 will have been partially returned or cocked into its viewing mode position as shown in solid line fashion.

Camera 10 must be configured to retain a battery source of electrical power for performing the noted motorized functions of releasing reflex component 44 for movement into its exposure position; for cocking component 44 into its viewing position following an exposure interval; for maneuvering the uppermost film unit 38 into the bite of rolls 76 and 78; for powering rolls 76 and 78 as well as operating other photographic instrumentalities. A provision of such a power source while retaining requisite thinness and compactness is not simply achieved and, accordingly, any available power supply is severely limited. In the present photographic system a battery power supply is provided as a flat primary battery located within cassette 32 beneath the stacked assemblage of film units as at 40. This battery is illustrated in cross-section at 42 in FIG. 2. Connection between battery 42 and the control system of camera 10 is provided by terminals formed within the base 18 and communicating through openings in the bottom of cassette 38 with corresponding terminals formed upon the downwardly facing side thereof. A cassette structure incorporating a flat battery similar to that disclosed herein is described in a U.S. Pat. No. 3,543,662, entitled, "Film Cassette Including Battery Power Supply," by I. Erlichman.

As may be noted from the above discussion of optical path alteration through movement of reflex component 44 between positions 44' and 44'', the control system of the camera 10 is called upon to regulate a somewhat involved series of procedures. Among these procedures or steps in a controlling process, the exposure control system of the camera is called upon to secure exposure chamber 28 from light leakage during movement of component 44 as well as to provide for automatic regulation of exposure interval. Preferably, the latter exposure control should provide for a dual exposure parameter regulation in which both aperture and exposure interval are controlled in accordance with a predetermined, optimized program. For instance, relative aperture should be selected automatically to optimize depth of field, while exposure interval is selected to maximize taking speed.

Looking to FIGS. 1 and 3, an exposure control mechanism ideally suited for performing under the above-noted operational criteria is shown generally at 90. Described in more detail and claimed in a U.S. Pat. entitled, "Exposure Control System," by V. K. Eloranta, No. 3,641,889, exposure mechanism 90 is formed having two blades or elements 92 and 94 which slideably ride in a track (not shown). Each blade, 92 and 94 is formed having a teardrop shaped aperture opening as shown respectively at 96 and 98. Additionally, the blades are formed having secondary openings shown respectively at 100 and 102 which move in cooperation before the detecting elements of a photosensing network positioned behind an entrance optical assembly 104. Openings 96 and 98 of respective blades 92 and 94 are mounted for movement across the optical path of the camera 10 as it is established at taking lens 54. Depending upon the position of blades 92 and 94, openings 96 and 98 symmetrically overlap to define selectively varying aperture sizes. Secondary openings 100 and 102 are configured in correspondence with the contours of respective openings 96 and 98. These openings also move in mutual symmetry over the optical path of the light sensing network.

Blades 92 and 94 move in mutual symmetry as a result of their connection with a walking beam as shown at 106. Walking beam 106 is formed having a centrally disposed hub portion 108 which is journaled for rotation about an upstanding stud (not shown) extending from the rearward portion of exposure control housing 16. Elongate slots, as at 110 and 112, are formed in the outward tip portions of walking beam 106 for the purpose of providing connection with pins 114 and 116 extending, respectively, from blades 92 and 94.

Thus interconnected, the blades 92 and 94 move simultaneously and in correspondence with each other to define a continuous progression of symmetrically configured variable aperture openings over the camera optical path at taking lens 54 as well as over the light sensing network optical path at 104. Elongate slots 110 and 112 serve the function of accommodating the horizontally restricted movement of blades 92 and 94.

Walking beam 106 is biased for rotation in a manner wherein openings 96 and 98 of respective blades 92 and 94 define a relative aperture of maximum dimension over the optical path of the camera. This bias is derived from a spring 118, the central portion of which is wound about hub 118. The movable end 120 of spring 118 is configured for biased contact against beam 106, while its stationary end 122 is configured to abut against a pin 124 extending from a rear portion of exposure housing 16 (FIG. 3). With spring 118 so connected, the exposure mechanism is biased for moving blades 92 and 94 into a normally open orientation wherein openings 96, 98, 100 and 102 cooperate to define widest available apertures. This fully open condition of mechanism 90 is shown in FIG. 3. Movement of blades 92 and 94 from their normally open orientation into a closed orientation blocking the passage of light along the optical path of the camera is carried out by a tractive electromagnetic drive present as a solenoid mounted within exposure housing 16 by a bracket as at 132 (FIG. 3). Solenoid 130 is designed having an internally disposed cylindrical plunger or armature 134 which retracts inwardly within an excitation winding upon energization thereof. Plunger 134 is connected to walking beam 106 by a comb-shaped connector 136 slideably fitted over a pin 138 extending from beam 106.

When solenoid 130 is energized to retract plunger 134, walking beam 106 is rotated rapidly against the bias of spring 118 to move blades 92 and 94 into the closed orientation shown in FIG. 1. Note in the latter figure that the optical path of the camera as defined through taking lens 54 is completely blocked.

Figure 4:
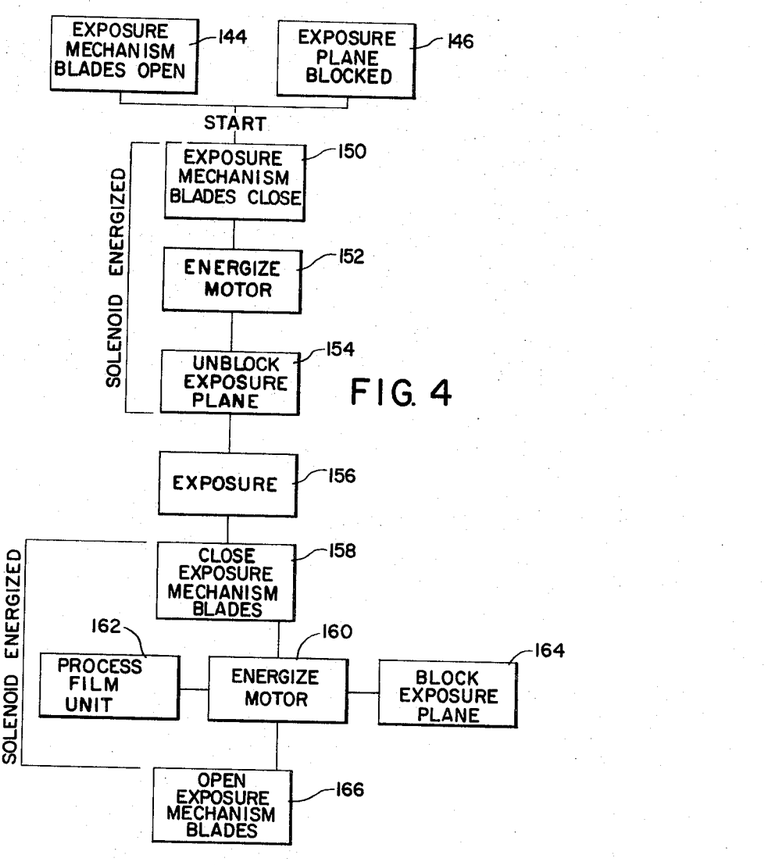
FIG. 4 is a block logic diagram showing the sequence of events occurring during a photographic cycle of the camera of FIG. 1.

Turning to FIG. 4, the control operations of camera 10 which operate in conjunction with the performance of exposure mechanism 90 are revealed in block diagrammatic fashion. Prior to making an exposure, camera 10 is erected from its folded configuration and a scene to be photographed is focused and framed at viewing surface 56. To provide for such viewing and focusing, the components of camera 10 assume viewing mode configuration in which reflex component 44 is in position 44' covering the exposure plane at uppermost film unit 38. Component 44 is retained in position by virtue of the engagement of follower 70 of ram 72 against a high dwell portion of cam 68. To assure adequate lighting for facilitating viewing and focusing, openings 96 and 98 of exposure mechanism 90 establish a maximum available aperture width. Further, all of the control components of the camera 10 remain in a relaxation mode, no current being drawn from battery source 42. This viewing and focusing mode status is portrayed in FIG. 4 at blocks 144 and 146.

A photographic cycle is commenced with the depression of a start button 148 located in the forward face of exposure housing 16. With the depression of start button 148, solenoid 130 is energized to cause the retraction of plunger 134 and the closure of exposure mechanism 90. The latter closure is depicted at block 150. Solenoid 130 is held in an energized state so as to secure exposure chamber 28 from external light while reflex component 44 is moved to its exposure position 44''. Release or unlatching of component 44 is carried out by providing a brief energization of motor 64 such that the phase regulating circuit of gear train 66 rotates cam 66 out of contact with follower 70 of ram 72. The resultant release of contact permits reflex component 44 to be driven to its exposure position under the bias of a drive spring. The noted brief energization of motor 64 is indicated at block 152, while the procedure of unblocking the exposure plane by movement of component 44 is indicated at block 154. Solenoid 130 is retained in an energized state while functions 150, 152 and 154 are carried out. A control system and mechanism for carrying out the noted brief energization of motor 64 and consequent release of reflex component 44 is described and claimed in a copending application for United States Patent by E. K. Shenk, entitled, "Reflex Camera with Motor Drive," filed Apr. 16, 1971, Ser. No. 134,725, and assigned in common herewith.

Following conversion of camera 10 to its exposure mode wherein reflex component 44 is at position 44'', an exposure interval commences as indicated at block 156 with the de-energization of solenoid 130. With this de-energization, drive spring 118 rotates walking beam 106, in turn, to move blades 92 and 94 to progressively enlarge the aperture over the optical path of the camera. Simultaneously, secondary or photocell sweep openings 100 and 102 define a corresponding progressively enlarging aperture opening over the light sensing network detector located rearwardly of entrance optics 104. When an appropriate amount of light is received through opening 104 to trigger a control circuit, solenoid 130 is again energized to cause retraction of plunger 134 and consequent rotation of walking beam 106 against the bias of spring 118 to block the optical path of the camera. An exposure interval is terminated thereby as indicated at block 158. With the ambient operation thus described, relative aperture as well as exposure interval are selectively weighted for any given level of scene brightness so as to optimize the quality of a resultant photograph.

Following the closure or blocking of the optical path as indicated at 158, motor 64 is again energized for purposes of driving rolls 76 and 78 to process an uppermost film unit 38 as well as to drive reflex component 44 into its viewing and focusing position at 44'. This second energization of motor 64 is indicated by block 160 while the operation of a processing station is indicated at block 162 and simultaneous cocking or driving of reflex component 44 to position 44' is indicated by block 164. As in the earlier optical path conversion of camera 10, the solenoid 130 must be retained in an energized state to secure exposure chamber 28 throughout processing and cocking until such time as the exposure plane is blocked. When exposure chamber 28 is secure, the control system of the camera is de-energized to permit blades 92 and 94 to return under the bias of spring 118 to a terminal position defining an aperture of maximum width. This function is indicated in FIG. 4 at block 166.

The instant invention provides a technique for operating the above outlined multi-step control process in a manner optimizing the limited energy available from the very small battery power source 42.

Figure 5:
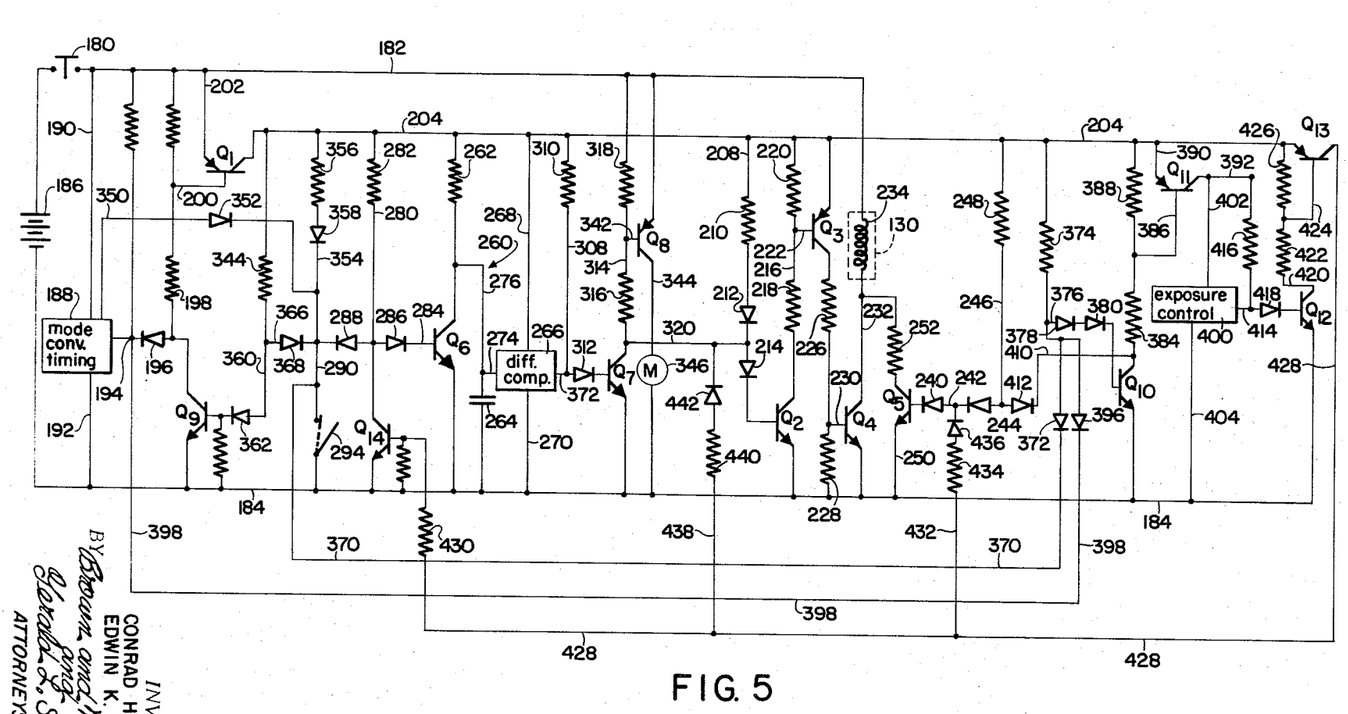
FIG. 5 is a schematic diagram of a control circuit as used in conjunction with the exposure control system of the camera of FIG. 1.

Referring to FIG. 5, a control circuit for operating camera 10 in accordance with the noted program and under the limited power supply available is depicted. A photographic cycle is commenced with the depression of start button 148 to close a switch 180. When closed, switch 180 energizes main power lines 182 and 184 from a battery 186. Battery 186 corresponds with battery 42. Energization of lines 182 and 184 initially enables a mode conversion timing function 188 from along lines 190 and 192. Conversion timing function 188 includes an R-C timing network and triggering circuit such as a differential comparator and operates to time-out the length of time required for reflex component 44 to reach position 44''. In this regard, the output 194 of timing function 188 remains at the ground potential of power line 184 until such time as the reflex component 44 reaches position 44''. For purposes of facilitating the description to follow, when the outputs of such triggering systems or comparators are at the ground reference potential of line 184, they are referred to as "low" and when they assume the voltage status of source line 182, they are referred to as being "high."

Output 194 is coupled through a diode 196, bias resistor 198 and line 200 to the base electrode of a PNP transistor $Q_1$. The emitter of transistor $Q_1$ is coupled through a line 202 to main power line 182 and its collector is connected with a secondary or logic power line 204. The "low" status at output 194 of mode conversion timing function 188 at the commencement of a photographic cycle serves to forward bias the base-emitter junction of transistor $Q_1$, thereby powering logic power line 204 from power line 182.

Energization of logic power line 204 from transistor $Q_1$ serves initially to energize solenoid 130 by forward biasing the base-emitter junction of an NPN transistor $Q_2$. Forward biasing current is directed to the base of transistor $Q_2$ from line 204 through a line 208, bias resistor 210, diode 212 and diode 214. The emitter of transistor $Q_2$ is coupled to reference power line 184, while its collector is coupled to power line 204 through line 216 including resistors 218 and 220. An "on" status at transistor $Q_2$, in turn, forward biases the base-emitter junction of a PNP transistor $Q_3$, the base of which is connected to line 216 and resistor 218 from a line 222. The emitter of transistor $Q_3$ is connected with power line 204 and its collector is connected along a line 224 through resistors 226 and 228 to ground reference line 184. Conduction through line 224, in turn, forward biases the base-emitter junction of an NPN transistor $Q_4$, the base of which is connected to line 224 through line 230. The emitter of transistor $Q_4$ is coupled to ground reference line 184, while its collector is connected along a line 232 to the winding 234 of solenoid 130. The opposite end of winding 234 is coupled with main power line 182. In the instant figure, solenoid 130 is depicted functionally by a dashed boundary.

Simultaneously with the energization of solenoid 130 occasioned by the forward biasing of transistor $Q_4$, a power-down input is activated by the forward biasing of an NPN transistor $Q_5$ from line 204. The base of transistor $Q_5$ is coupled to logic power line 204 through diode 240, line 242, diode 244, line 246 and bias resistor 248. Connection is made between the winding 234 and the collector of transistor $Q_5$ through a path including current limiting resistor 252, while the emitter thereof is coupled with ground line 184 through line 250. Because of the presence of current limiting resistor 252, the forward biasing of transistor $Q_5$ has negligible effect on the energization of winding 234 while transistor $Q_4$ retains an "on" status.

The time interval required for solenoid 130 to cause blades 92 and 94 to assume a closed or optical path blocking status thereby securing exposure chamber 28 is followed by an R-C timing network 260 comprised of resistor 262 and a capacitor 264 operating in conjunction with a differential comparator 266. Differential comparator 266 is coupled to logic power line 204 from along line 268, and to ground reference line 184 from along line 270. The comparator 266 is of conventional design, operating as a non-inverting amplifier. The output of comparator 266 at line 272 may assume a "high" or "low" status in response to the receipt at its input line 274 of a voltage signal, respectively, above or below a predetermined reference level. This signal is derived from the R-C timing network 260. Input 274 of differential comparator 266 is coupled to a line 276 joining resistor 262 and capacitor 264.

Timing network 260 is designed having a time constant selected to reach the trigger level of differential comparator 266 in a period of time corresponding with the time required to assure that the blades 92 and 94 of exposure mechanism 90 have moved from a fully opened position to a fully closed terminal position. During this timing interval, the output at line 272 assumes a "low" status. Timing operation of the network 260 is permitted as a result of the "off" status of an NPN transistor $Q_6$. The collector of transistor $Q_6$ is coupled to line 276 intermediate resistor 262 and the capacitor 264, and its emitter is connected through line 278 to ground reference line 184. Thus connected, transistor $Q_6$ is used to selectively shunt capacitor 264 and reset network 260. To forward bias transistor $Q_6$ and thereby shunt capacitor 264, biasing current is supplied to the base thereof from logic power line 204 through line 280, bias resistor 282, line 284 and diode 286. At the commencement of a photographic cycle while exposure mechanism 90 is being closed, this forward biasing current is diverted through diode 288, line 290, and across a closed switch 294 to ground reference line 184. Switch 294 is a phase cycle switch which is actuated upon movement of reflex component 44 into or out of its viewing mode position 44'.

Looking to FIG. 1, the switch 294 is shown to comprise an insulative base 296 which supports two up-standing contact leaves 298 and 300. Base 296 is supported upon a portion of the frame of base member 18 which is not shown in the interest of clarity. A small lever 302 is pivotally mounted to base 18 and mechanically associated with ram 72 so as to be selectively driveable into contact with switch leaf 298 to effect closure thereof when reflex number 44 is in position 44'. Upon release of component 44 from its position at 44', arm 302, driven by ram 72, immediately releases the contact between switch leaves 298 and 300.

Returning to FIG. 5, when timing network 260 achieves the threshold or reference voltage of comparator 266 following a period of time corresponding with that required by solenoid 130 to fully close the blades of exposure mechanism 90, the output at line 272 becomes "high." A "high" output at line 272 terminates a clamping current flow from logic power line 204 into line 308, bias resistor 310 and output line 272 of comparator 266. As a result, current now passes through diode 312 to forward bias the base-emitter junction of an NPN transistor $Q_7$. The emitter of transistor $Q_7$ is connected with power reference line 184 and its collector is connected with power line 182 through a line 314 including bias resistors 316 and 318.

As transistor $Q_7$ conducts, forward biasing current otherwise passing along line 208 to the base-emitter junction of transistor $Q_2$ is shunted through line 320. Line 320 is coupled between the collector of transistor $Q_7$ and line 208. Removal of the forward bias at transistor $Q_2$, in turn, removes the forward bias at transistors $Q_3$ and $Q_4$. As transistor $Q_4$ assumes an "off" status, the drive path into solenoid 130 is altered to exclude transistor $Q_4$, the energization path now including only current limiting resistor 252 and forward biased transistor $Q_5$. Accordingly, plunger 134 of solenoid 130 is retained in its retracted position by a holding current of diminished magnitude, and the current drain from battery 42 is significantly lessened.

In a tractive electromagnet such as solenoid 130, the physical action involved in its operation is that of converting electric energy from battery 42 into work by the motion of plunger 134. Plunger 134 has a stroke of somewhat limited length, for instance 0.125 inches, which is amplified by its offset connection with walking beam 106. In addition to frictional forces developed by the exposure control mechanism 90 mountings, the solenoid 130 must overcome the variable force imparted from spring 118 in the course of movement of its plunger 134 into its retracted position. The electric energy converted to work by solenoid 130 in the course of its operation is conventionally represented by the formula:

$$W = Id(N\phi) \text{ joules}$$

where: $I$ represents the exciting current of the solenoid in amperes and the expression ($N\phi$) represents flux linkage with plunger 134 in maxwell-turns. An analysis of the work and energy dissipating characteristics of a solenoid as at 130 reveals that, for a given exciting current, the flux linkage with plunger 134 increases somewhat geometrically in magnitude as the plunger 134 closely approaches its fully retracted position.

Figure 6:
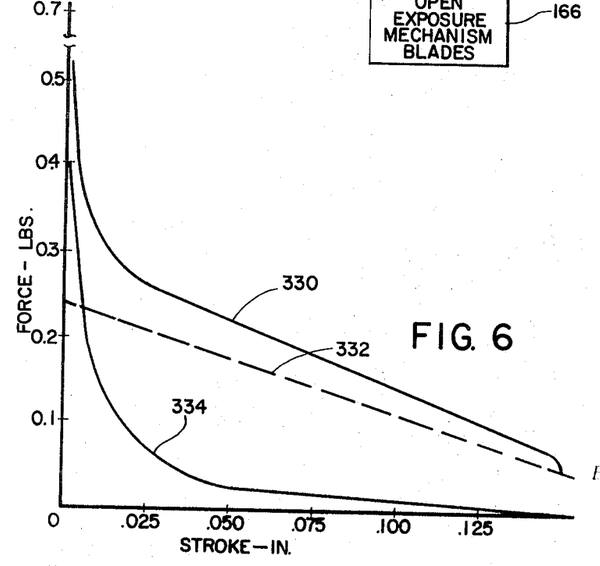
FIG. 6 is a chart relating output force and stroke characteristics of a solenoid drive utilized in connection with the shutter of FIG. 3.

Referring to FIG. 6, a graphical representation of retractive force imparted to plunger 134 as it is drawn from its extended to its seated position is shown at 330. Note that as the plunger closely approaches its zero stroke position, the enhanced flux linkage evolves a considerably magnified retracting force. Also displayed in FIG. 6 is a characteristic force curve 332 for a spring as at 118 as it is tensioned by the solenoid 130. The force value developed by spring 118 at the zero stroke position of plunger 134 represents the total force which must be overcome by the solenoid 130. For instance, dynamic and frictional characteristics of the exposure mechanism 90 need not be considered at this terminal position. Accordingly, by re-orienting the energization path into the winding 234 of solenoid 130 to incorporate current limiting resistor 252 after the plunger 134 has reached its fully seated or zero stroke position, a lower exciting current can retain the exposure mechanism 90 in a position fully blocking the optical path of camera 10. The force-stroke characteristic of solenoid 130 at such reduced current is represented in FIG. 6 by curve 334. While the force characteristics of solenoid 130 under the reduced or holding exciting current is grossly inadequate over most of the stroke of plunger 134, it does evidence acceptable force values as plunger 134 reaches a position somewhat closely proximate its zero stroke terminal location. To provide this energy conserving feature, however, it is necessary to assure that the plunger 134 has reached an appropriate seated position and to determine with confidence the amount of force which must be accommodated at this position. These criteria are met with the instant system inasmuch as the power-down function does not assume an active role until a select delay responsive to the closure of blades 92 and 94 and inasmuch as no dynamic or related frictional force characteristics need be accommodated at the fully closed position of exposure mechanism 90.

Returning to FIG. 5, in addition to actuation of the power-down function, the "firing" of differential comparactor 266 and consequent forward biasing of transistor $Q_7$ permits the forward biasing of the base-emitter junction of a PNP transistor $Q_8$. The base of transistor $Q_8$ is coupled to line 314 from along line 342, while its emitter is coupled to power line 182. The collector of transistor $Q_8$ is connected to line 344 which, in turn, is connected to the terminals of a d.c. motor 346 and with ground reference line 184. Motor 346 corresponds with motor 64 of camera 10. With the forward biasing of transistor $Q_8$, motor 346 is energized and reflex component assembly 44 is released for movement into its exposure mode orientation at 44''. As the reflex component 44 leaves its cocked orientation at 44', switch 294 is opened to de-energize motor 346 and activate mode conversion timing function 188.

This initial de-energization of motor 346 is carried out by the reassertion of a forward biasing current flow along line 280, through bias resistor 282, line 284 and diode 286 to the base of NPN transistor $Q_6$. With the opening of the phase cycle switch 294, this forward biasing current is no longer diverted through diode 288 and switch 294. As a consequence, timing capacitor 264 of timing network 260 is shunted to ground reference line 184 by line 278. With the shunting of capacitor 264, the output at line 272 of differential comparator 266 goes "low" and current at line 308 is diverted from the base of transistor $Q_7$ into the output 272 of differential comparator 266. As a consequence, the forward bias exerted at transistor $Q_7$ is removed and conduction through line 314 is terminated. As a result, the forward bias at transistor $Q_8$ is removed and motor 346 is de-energized. The initial energization of motor 346 is very brief, amounting to the period of time required for phase control cam 68 (FIG. 1) to rotate through about 10 degrees.

Early in a photographic cycle, while switch 294 is closed, the timing operation of mode conversion timing function 308 is restrained by a current diverting clamp including a line 350, diode 352, line 354 and switch 294. Line 354 is connected between logic power line 204 and reference level power line 184 and includes a current limiting resistor 356 and diode 358 as well as switch 294. With the opening of switch 294, line 350 no longer communicates with ground reference line 184 through line 354, and function 188 is permitted to commence timing the period required for reflex component 44 to move from its viewing mode position 44' into its exposure mode position 44''.

An opening of switch 294 also permits the forward biasing of the base-emitter junction of NPN transistor $Q_9$. The base of transistor $Q_9$ is connected with logic power line 204 through a line 360 including diode 362 and a bias resistor 364. Current flow through line 360 is diverted through line 366 and a diode 368 into line 354 whenever switch 294 is closed. Accordingly, with the closure of switch 294, transistor $Q_9$ is "off." The emitter of transistor $Q_9$ is coupled to ground reference line 184, while its collector is connected through resistor 198 and line 200 to the base of transistor $Q_1$. A latching arrangement is provided thereby which serves to hold transistor $Q_1$ "on" as long as switch 294 is open.

The opening of switch 294 de-activates another clamping arrangement including line 370 which extends through a diode 372 and bias resistor 374 to logic power line 204. Coupled to line 370 at a point intermediate diode 372 and bias resistor 374 is a line 376 incorporating diodes 378 and 380 and extending to the base of an NPN transistor $Q_{10}$. The emitter of transistor $Q_{10}$ is connected to ground reference line 184 and its collector is connected through line 382, bias resistor 384 and line 386 to the base of a PNP transistor $Q_{11}$. A resistor 388 is connected in line 382 between line 386 and logic power line 204 to provide "turn-off" bias at transistor $Q_{11}$. The emitter of transistor $Q_{11}$ is connected to logic power line 204 through line 390 and its collector is connected with an exposure function power line 392.

Transistors $Q_{10}$ and $Q_{11}$ being thus interconnected, when transistor $Q_{10}$ is forward biased by current from line 376, through diodes 378 and 380, conduction to ground line 184 will be completed and the base-emitter junction of transistor $Q_{11}$ will be forward biased. However, when switch 294 is closed, current otherwise forward biasing transistor $Q_{10}$ is diverted along the clamping arrangement including line 370 and switch 294. When switch 294 is opened, another clamping arrangement including diode 396 and line 398 provides a current diverting path to the output 194 of mode conversion timing function 188 in order to retain transistor $Q_{10}$ in a reverse biased state while timing function 188 is timing-out the period required for reflex component 44 to reach its exposure mode position 44''. During this period, the output at line 194 will be "low" and, as a consequence, clamping line 398 is permitted to provide a diverting function.

When timing function 188 has timed out the movement of reflex component 44, output line 194 assumes a "high" status, thereby terminating the flow current through line 398. As a consequence, biasing current is introduced from line 204 through line 376 to forward bias transistor $Q_{10}$. An "on" status at transistor $Q_{10}$ promotes a corresponding "on" status at transistor $Q_{11}$, thereby energizing line 392 from line 204 through line 390. Energization of line 392, in turn, energizes an exposure control function 400. Exposure control function 400 is connected with line 392 from along line 402 and with ground reference power line 184 from along line 404 and may be similar to that described in a U.S. Pat., by J. P. Burgarella, entitled, "Exposure Control System."

Conduction across transistor $Q_{10}$ also activates a current diverting line 410 extending from line 382, through diode 412 to line 246. Line 246 otherwise represents the forward biasing input to power-down transistor $Q_5$. When activated, line 410 serves to divert this biasing current passing through line 246 and bias resistor 248 from the base of transistor $Q_5$. As a result, transistor $Q_5$ is reverse biased into an "off" status simultaneously with the energization of exposure function power line 392. Inasmuch as transistor $Q_4$ is in an "off" status as transistor $Q_5$ is turned "off," winding 234 of solenoid 130 is de-energized to release the blades 92 and 94 of shutter mechanism 90 for movement from a fully closed position toward an open position under the bias of spring 118.

During the ensuing exposure interval, the output at line 414 of exposure control function 400 remains "low" until an exposure detecting function therein reaches the threshold value of a differential comparator also contained therein. When this threshold level is reached, the comparator triggers to rapidly change the output at line 414 to a "high" status. During an exposure interval, when the output at line 414 is "low," current is permitted to pass from line 392 through a bias resistor 416 to communicate with ground level through control function 400 and line 404. When the output at line 414 goes "high" at the termination of an exposure interval, current passes from line 392 through bias resistor 416 and diode 418 to the base of NPN transistor $Q_{12}$. The emitter of transistor $Q_{12}$ is connected to ground reference line 184 and its collector is connected through line 420, bias resistor 422 and to line 424 to the base of a PNP transistor $Q_{13}$. A "turn-off" bias resistor 426 is connected between line 424 and power line 204. The emitter of transistor $Q_{13}$ is connected with logic power line 204 and its collector is connected to line 428. Line 428 is connected through a bias resistor 430 to the base of NPN transistor $Q_{14}$ which functions to reactivate timing network 260. Line 428 additionally is coupled through line 432, bias resistor 434 and to diode 436 to line 242 leading, in turn, to the base of transistor $Q_5$. Further, line 428 is connected by a line 438, bias resistor 440 and diode 442 to line 320 leading, in turn, to the base of transistor $Q_2$ by way of diode 214.

At the end of an exposure interval, the output of exposure control function 400 at line 414 will assume a "high" status to cause the forward biasing of transistor $Q_{12}$. When forward biased, transistor $Q_{12}$ draws the base-emitter junction of transistor $Q_{13}$ into a forward biased condition. As a consequence, current flows from line 204 through line 428. Line 428, in turn, energizes both lines 432 and 438 to cause a respective forward biasing of the base-emitter junctions of transistors $Q_5$ and $Q_2$. As noted earlier, when transistor $Q_2$ is forward biased, transistors $Q_3$ and $Q_4$, correspondingly, are forward biased to energize the winding 234 of solenoid 130. Additionally, the power-down network is activated or caused to assume a "standby" condition with the forward biasing of transistor $Q_5$. The energization of winding 234 evolving from the forward biasing of transistor $Q_2$ causes shutter exposure mechanism 90 to reclose blades 92 and 94 and terminate an exposure.

Timing function 260 is reactivated with the forward biasing of transistor $Q_{14}$ from line 428 and bias resistor 430. The emitter of transistor $Q_{14}$ is connected to ground reference power line 184 and its collector is connected to line 280. When current from line 428 forward biases transistor $Q_{14}$, current from line 280 is diverted from line 284 and a forward bias at transistor $Q_6$ is removed. As a result, the shunt about timing capacitor 264 is removed and timing network 260 commences to time-out the period required for blades 92 and 94 of exposure mechanism 90 to close. The output at line 272 of differential comparator 266 remains "low" until this shutter timing period terminates, at which time that output assumes a "high" state. While the output at line 272 remains "high" the base-emitter junction of transistor $Q_7$ is forward biased from along line 308 and diode 312. When transistor $Q_7$ is forward biased, transistor $Q_8$, in turn, is forward biased to cause motor 346 to be re-energized from line 344 and power line 182.

The forward biasing of transistor $Q_7$ occasioned by the "high" status of the output 272 of differential comparator 266 also diverts forward biasing currents from lines 438 and 208 hrough line 320. As a consequence, transistor $Q_2$ is reverse biased which, in turn, causes a simultaneous reverse biasing of transistors $Q_3$ and $Q_4$. With the reverse biasing of transistor $Q_4$, the power input path to winding 234 of solenoid 130 is again realigned to actively incorporate current limiting resistor 252. The plunger 134 of solenoid 132 is retained in its fully retracted position by a lower level holding current to provide conservation of energy available from battery 42.

Returning momentarily to FIG. 1, once the power-down function of the control circuit has been activated, motor 64 is permitted to drive gear train 66 to cause ram 72 to perform a function of cocking reflex component 44 as well as to power the self-processing station including rolls 76 and 78. This cocking and processing operation continues until an exposed uppermost film unit 38' is fully processed and reflex component 44 has been cocked against force of its drive spring and into position 44'. As component 44 reaches this position, the exposure chamber 28 is again secured to permit viewing and focusing. A signal representing the attainment of this position is provided from the cocking action of ram 72 as it is driven from cam 68. When ram 72 is in a position corresponding with an appropriate positioning of component 44 at 44', leaves 298 and 300 of switch 294 will have made contact under the pressure of arm 302.

Returning to FIG. 5, when switch 294 closes at the termination of photographic cycle, forward biasing current otherwise directed to transistor $Q_9$ is diverted through diode 368 and line 290 through the switch 294 to power reference level line 184. Transistor $Q_9$ is reverse biased and, in turn, transistor $Q_1$ is reverse biased. The resultant de-energization of logic power line 204 shuts down the entire circuit to terminate a photographic cycle. As a consequence, winding 234 of solenoid 130 is de-energized to permit blades 92 and 94 of exposure mechanism 90 to be driven to a fully open orientation under the bias of spring 118. The components of camera 10 will then have reassumed their viewing and focusing mode orientations.

Figure 7:
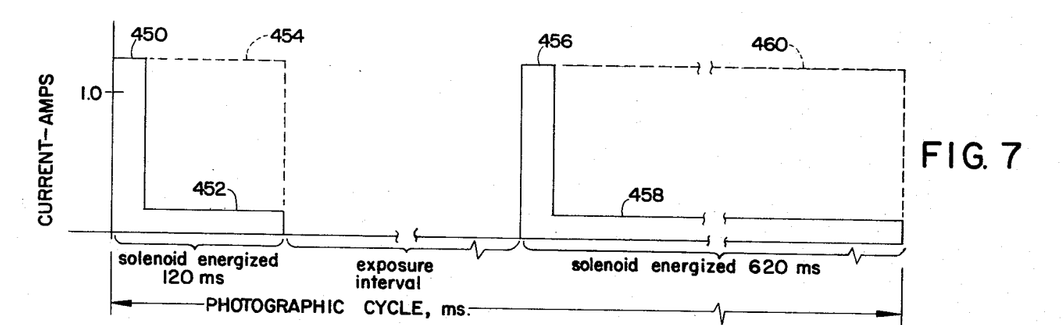
FIG. 7 is a chart showing current demand for selected operational phases of the camera of FIG. 1.
Figure 8:
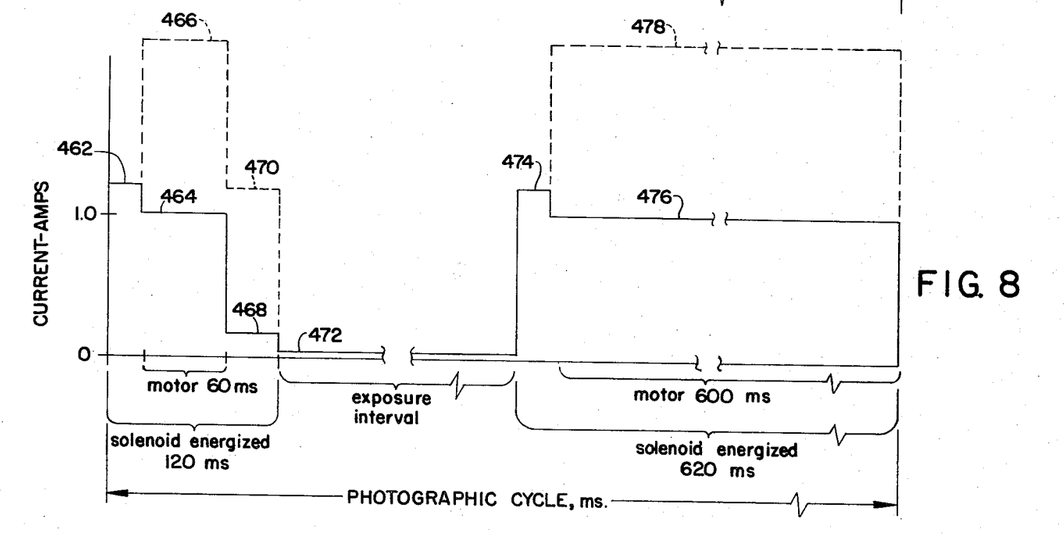
FIG. 8 is a chart showing the information of FIG. 7 as it is combined with additional operational features of the camera of FIG. 1.

Referring to FIGS. 7 and 8, the contribution of the power-down feature of the invention in optimizing available energy from battery 42 is revealed in chart form. In FIG. 7, typical current drain values as imposed by solenoid 130 during its first and second energizations are displayed. For instance, during initial closure of exposure mechanism 90, as indicated at 150 in FIG. 4, full power is made available to the solenoid at about 1.2 amperes for about 20 ms. This full utilization of current available from battery 42 provides a positive closure of blades 92 and 94 in as rapid an interval of time as possible. When full closure is assured, the power-down operation drops the power demand of solenoid 130 to about 140 ma as shown at level 452. Without the presence of the power-down feature, current demanded by the solenoid throughout its initial 120 ms energization up to the commencement of an exposure as indicated at 156 in FIG. 4 would be represented by dotted line 454. Following an exposure interval, which varies for any scene condition, solenoid 130 is energized again under maximum available current as shown at level 456. When blades 92 and 94 are fully closed, the power-down feature again is activated to drop current level to that shown at 458. The latter level is held for about 620 ms, or an interval sufficient to provide for processing of uppermost film unit 38 as well as cocking reflex component 44 to its position 44'. The current demand otherwise made by solenoid 130 is depicted by dotted line 460.

Looking to FIG. 8, the current demands of solenoid 130 are depicted as they relate to current demands imposed by the operation of motor 64 as well as to those of a typical exposure control circuit. At the commencement of an exposure cycle, solenoid 130 is initially energized at full available power as shown by level 462. Following an interval of time, about 20 ms, sufficient to assure that blades 92 and 94 are fully closed, the power-down feature is activated simultaneously and in correspondence with the energization of motor 64. The combination of the demands of motor 64 with the power-down solenoid are revealed at level 464. Without such power-down feature, this combined level would be that represented by dotted line 466. Following a 60 ms energization of motor 64, current demand returns to that required by the power-down feature as shown at level 468 as opposed to non-power-down demands evidenced by dotted line lever 470. A current demand of about 70 ma is made during an exposure interval as indicated by line 472. At the termination of an exposure interval, blades 92 and 94 of exposure mechanism 90 must be closed as rapidly as possible to assure efficient shutter operation. Accordingly, maximum power available from battery 42 is introduced to solenoid 130 as shown at level 474. This maximum current level input is retained for a length of time sufficient to assure the full closure of blades 92 and 94, following which interval the power-down feature is again activated simultaneously with the energization of motor 64. This second energization of motor 64, as described in connection with block 160 of FIG. 4, is of length of time adequate to provide for film processing and recocking of reflex component 44 as indicated at blocks 162 and 164 of FIG. 4. About 600 ms are typically required for such operations and the total current level demand is represented by line 476. Without the power-down feature of the invention, this current demand would be represented by dotted line 478. The energy conserved by the power-down feature becomes readily apparent in examing the solid vs. dotted current demand levels shown in FIG. 8. With the power-down arrangement, a small, compact battery as at 42 may provide adequate power levels for the exposure of all film units 40.

It readily can be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practiced in a manner otherwise than is specifically described herein.

What is claimed is:

1. Photographic apparatus comprising:
    means for receiving a source of electrical power;
    instrumentality means actuable to perform control functions in the course of producing a photographic record, at least one of said functions including the movement of an element into a terminal position;
    drive means, including a tractive electromagnet energizable to attain a high flux linkage condition, for selectively actuating said instrumentality means to perform said at least one control function;
    an electric motor energizable from said source to effect another said actuation of said instrumentality means;
    control means including first means for energizing said tractive electromagnet directly from said source, second means for energizing said electromagnet from said source at a selectively reduced input current level, selective enabling means for simultaneously activating said first and second means to initially energize said electromagnet at the maximum available output current level of said source and for substantially maintaining said output level energization and subsequently deactivating said first means only when said electromagnet has substantially attained said high flux linkage, said selective enabling means deactivating said first means when said motor is energized.

2. The photographic apparatus of claim 1 wherein:
said tractive electromagnet includes an excitation winding and a plunger retractable toward a position thereinto establishing said high flux linkage condition when said winding is energized;
said instrumentality means includes exposure mechanism means having at least one element movable substantially into a terminal position for blocking the passage of light along an optical path;
said drive means includes means interconnecting said at least one element and said plunger and biasing said plunger away from said retracted position; and
said control means second means provides said energizing current to a level selected at cause said plunger to sustain said retracted position against said interconnecting means bias.

3. The photographic apparatus of claim 2 wherein said means interconnecting said exposure mechanism means and said plunger is configured to drive said at least one element into said blocking position when said plunger is substantially at said retracted position.

4. The photographic apparatus of claim 1 in which said selective enabling means includes means deriving a unique signal condition when said high flux linkage condition is attained, and means responsive to said unique signal condition for effecting said first means subsequent deactivation.

5. The photographic apparatus of claim 4 in which said enabling means includes electronic switch means operative to rapidly effect said first means subsequent deactivation.

6. A compact photographic camera of a type having a self-contained source of electrical power comprising:
optical path means for focusing a scene to be photographed and exposing photosensitive material located at an exposure plane to light from said scene;
reflex means actuable to move between a focusing orientation covering said exposure plane and an exposure position for converting said optical path between focusing and exposure configurations;
exposure mechanism means having an element driveable toward a terminal position for blocking the passage of light along said optical path means;
tractive electromagnetic means energizable to drive said exposure mechanism means element and operative to assume an enhanced flux linkage condition when said element approaches said terminal position;
electric motor means energizable from said source of electrical power for selectively driving instrumentalities within said camera;
control means for selectively actuating said reflex means, for energizing said tractive electromagnetic means from said source to selectively drive said exposure mechanism means element to said terminal position to regulate the passage of light along said optical path means in accordance with photographic exposure parameters, for securing said exposure plane from light by selectively retaining said tractive electromagnetic means in an energized condition when said reflex means is actuated, and including signal means deriving a unique signal condition when said exposure mechanism means element approaches said terminal position, and power-down means responsive to said unique signal condition for reducing energizing current introduced from said source into said tractive electromagnetic means during said energized condition for selective retention, said selective retention occurring when said electric motor means is energized from said source.

7. The compact photographic camera of claim 6 in which:
said tractive electromagnetic means is present as a solenoid having an excitation winding energizable from said source and a plunger retractable to a position thereinto to establish said enhanced flux linkage condition;
said exposure mechanism means includes means for biasing said element to move from said terminal position and for biasing said plunger under a given force from said retracted position; and
said power-down means current reduction is selected to overcome said biasing means force sufficiently to retain said plunger at said retracted position.

8. The compact photographic camera of claim 6 in which said power-down means comprises:
first circuit path means configured to utilize the available said output current of said source of electrical power for energizing said tractive electromagnetic means;
second circuit path means including a current limiting impedance for energizing said tractive electromagnetic means at a current level selectively lower than the level of said available output current; and
enabling means responsive to said unique signal condition for discontinuing the energization of said tractive electromagnetic means from said first circuit path means during said energized condition for selective retention.

9. The compact photographic camera of claim 8 wherein said enabling means is operative to simultaneously enable both said first and second circuit path means for energizing said tractive electromagnetic means directly from said source of electrical power to attain said high flux linkage condition.

10. Photographic apparatus comprising:
means for receiving a source of electrical power;
means for mounting an objective lens;
means for mounting a film unit at a focal plane of said lens;
blade means;
means for mounting said blade means for displacement between a first position, wherein said blade means does not serve to block the passage of light through said objective lens onto said film unit, and a second position, wherein said blade means serves to block the passage of light through said objective lens onto said film unit;
a tractive electromagnetic device;
means operably connecting said tractive electromagnetic device with said blade mounting means for effecting the displacement of said blade means from one of its said positions into its other said position upon energization of said tractive electromagnetic device;

means for indicating when said blade means has been displaced from its said one position substantially into its said other position;

circuit means for selectively electrically coupling said tractive electromagnetic device with said source of electrical power, said circuit means including means for defining two electrical paths between said source of electrical power and said tractive electromagnetic device and means responsive to a first imposed condition for simultaneously coupling said tractive electromagnetic device to said source of electrical power through both said paths so that a given current flow sufficient to effect the displacement of said blade means from its said one position into its said other position is effected between said source of electrical power and said tractive electromagnetic device and responsive to said indicating means for disrupting one of said electrical paths so that a current flow less than said given current flow but sufficient to hold said blade means in its said other position is thereafter effected between said source of electrical power and said tractive electromagnetic device.

11. The photographic apparatus of claim 10 additionally including:

a motor;

means adapted to be actuated by said motor for performing a function associated with the operation of said photographic apparatus; and means for energizing said motor from said source of electrical power subsequent to said disruption of said one electrical path and simultaneously with said lesser current flow being effected between said source of electrical power and said tractive electromagnetic device.

12. The photographic apparatus of claim 10 in which:

said mounting means includes spring means for biasing said blade means toward said one position; and said circuit means electrical paths are configured such that said current flow less than said given current flow is sufficient to hold said blade means in said other position against said spring means bias.

13. The photographic apparatus of claim 10 in which said means defining two electrical paths includes first and second electrical paths coupling said tractive electromagnetic device with said source of electrical power, said first path being configured for conducting said given current flow and said second path being configured to conduct said current flow less than said given current flow.

14. The photographic apparatus of claim 13 in which said second electrical path includes an impedance having a value selected for deriving said current flow less than said given current flow.

15. The photographic apparatus of claim 14 in which:

said mounting means includes spring means for biasing said blade means toward said one position; and said second electrical path impedance value is selected to derive a current flow sufficient to hold said blade means in said other position against said spring means bias.

16. The photographic apparatus of claim 13 in which said circuit means is operative to deactivate said first electrical path in response to said indicating means.

17. Reflex photographic apparatus comprising:

means for receiving a source of electrical energy;

means defining an exposure chamber;

means for mounting photosensitive material within said exposure chamber;

means including an objective lens for deriving an optical path extending within said chamber and convertible between one orientation for viewing a scene to be photographed and another orientation for exposing said photosensitive material to light from said scene;

exposure mechanism means including blade means movable between a first position permitting the passage of light from said objective lens into said chamber and a second position fully blocking the passage of light from said objective lens into said chamber, and spring means biasing said blade means to move from said second position;

a solenoid including an excitation winding and a plunger retractable thereinto toward a seated position upon energization of said winding;

means operably connecting said plunger with said blade means for effecting movement of said blade means toward said second position upon energization of said excitation winding;

means for indicating when said blade means has been moved substantially into said second position and said plunger has substantially attained said seated position;

circuit means actuable for selectively electrically coupling said excitation winding with said source of electrical power, said circuit means including means defining first and second electrical paths between said source of electrical power and said winding and means responsive to said actuation for simultaneously coupling said winding to said source of electrical power through both said paths so that one current flow into said winding sufficient to effect the said movement of said blade means by said plunger into said second position is derived and responsive to said indicating means for disrupting current flow in said first electrical path, said second electrical path being configured to provide a current flow less than said one current flow but sufficient to retain said plunger at said seated position thereafter being effected between said source of electrical power and said excitation winding; and means for actuating said circuit means to effect said exposure mechanism means blade means movement into said second position and for effecting a said optical path conversion when said blade means second position is attained.

18. The reflex photographic apparatus of claim 17 additionally including:

an electric motor;

instrumentality means configured to be actuated by said motor for performing a function associated with the operation of said photographic apparatus; and means for energizing said motor from said source of electrical power subsequent to said disruption of current flow in said first electrical path and simultaneously with said lesser current flow within said second electrical path between said source of electrical power and said excitation winding.

* * * * *